Jan. 12, 1954    J. C. MACY ET AL    2,665,652
LACING APPARATUS
Filed May 9, 1950    9 Sheets-Sheet 1

INVENTORS
James C. Macy
BY James J. Kusiv
Curtis, Morris + Safford
ATTORNEYS Jan. 12, 1954  J. C. MACY ET AL  2,665,652
LACING APPARATUS
Filed May 9, 1950  9 Sheets-Sheet 2

Jan. 12, 1954    J. C. MACY ET AL    2,665,652
LACING APPARATUS
Filed May 9, 1950    9 Sheets-Sheet 4

INVENTORS
James C. Macy
James J. Kusiv
BY Curtis, Morris + Safford
ATTORNEYS Jan. 12, 1954   J. C. MACY ET AL   2,665,652
LACING APPARATUS Filed May 9, 1950   9 Sheets-Sheet 6

INVENTORS
James C. Macy
James J. Kusiv
BY
Curtis, Morris + Safford
ATTORNEYS

Jan. 12, 1954

J. C. MACY ET AL

2,665,652

LACING APPARATUS

Filed May 9, 1950

INVENTORS
James C. Macy
BY James J. Kusiv
Curtis, Morris + Safford
ATTORNEYS

Patented Jan. 12, 1954

2,665,652

UNITED STATES PATENT OFFICE 2,665,652

LACING APPARATUS

James C. Macy, Westfield, and James J. Kusiv, Newark, N. J., assignors, by mesne assignments, to Universal Winding Company, Providence, R. I., a corporation of Massachusetts Application May 9, 1950, Serial No. 160,918

18 Claims. (Cl. 112—172)

This invention relates to lacing and stitching or sewing, and more in particular to a method and apparatus for lacing a strip of leather or other flexible ribbon-like material on to articles, for example, along the edges of flat objects such as leather brief cases or the like.

An object of this invention is to provide a method and apparatus for carrying on a lacing operation automatically and substantially continuously. A further object is to provide an improved mode of threading a flexible ribbon or thread-like member onto various articles. A further object is to perform a lacing or sewing operation in such a manner as to produce improved products of uniform high quality. A further object is to provide for the above with apparatus which is simple and sturdy in construction, inexpensive to manufacture and maintain and operate, adaptable to varying conditions of operation and to various uses, and which is thoroughly practical from a commercial standpoint and in other respects. A further object is to provide for the above with apparatus which may be operated by unskilled persons and which may be used with fragile materials without danger of damage thereto. These and other objects will be in part obvious and in part pointed out below.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the past, various articles or products have been produced having so-called "laced edges" or "lacings" which are decorative and may also act to hold parts together. These products have been of the handmade type with the lacings being applied manually, and generally through preformed holes in the work pieces. Thus, the quality of the products has depended upon the skill of the workmen, and the products are often considered inferior in some respects because of faulty workmanship or even because of a non-uniformity in the manner or style of work. This type of hand operation has also become expensive because of the rising costs in labor, and because of the tendency for workmen to be diverted to other less-exacting occupations. Efforts have been made to perform operations of this character with machines but these efforts have been largely unsuccessful and have not met with real success. In accordance with the present invention, lacing operations of this general character are performed in a manner which is fully automatic and requires no mechanical skill on the part of the operator. At the same time the resulting products are of uniform high quality, and thus may be superior in quality to those previously made by hand.

Figure 1:
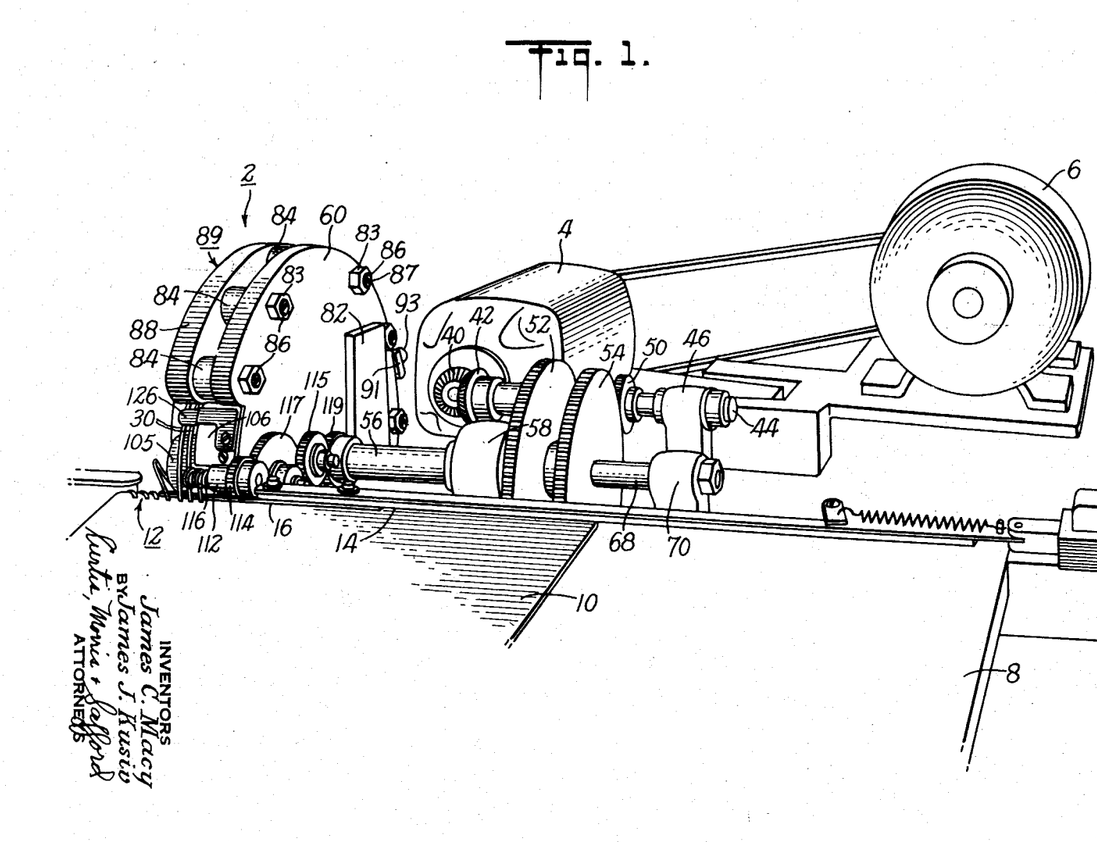
Figure 1 is a perspective view of one embodiment of the invention.
Figure 9:
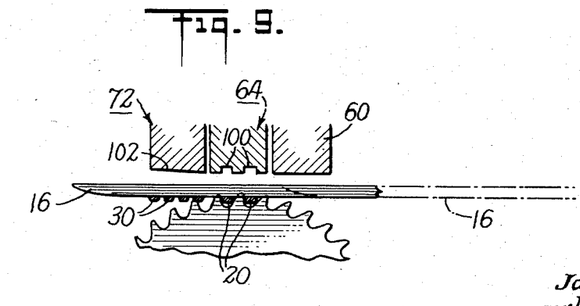

Referring particularly to Figure 1 of the drawings, a lacing head 2 is shown at the left and is operated through a variable speed drive unit 4 by an electric motor 6, with the article or work piece being supported on a stationary horizontal table 8. The work piece as here shown is a brief case 10 to the edges of which a wound lacing 12 is being applied, and the work piece proper comprises two rectangular pieces of leather having rounded corners laid face-to-face one upon the other. The edge of the work piece is held against the surface of table 8 by a guide strip 14 and (see Figure 2) a reinforcing "sword-like" guide 16 projects along the top of the work piece through and beyond the work zone where the lacing operation is taking place, and this guide 16 supports and reinforces the loops of the lacing as they are tightened. When lacings are being placed upon the corners of the work piece this guide 16 is withdrawn (see Figure 9) by sliding it to the right from the full line to the broken line position.

Figure 18:
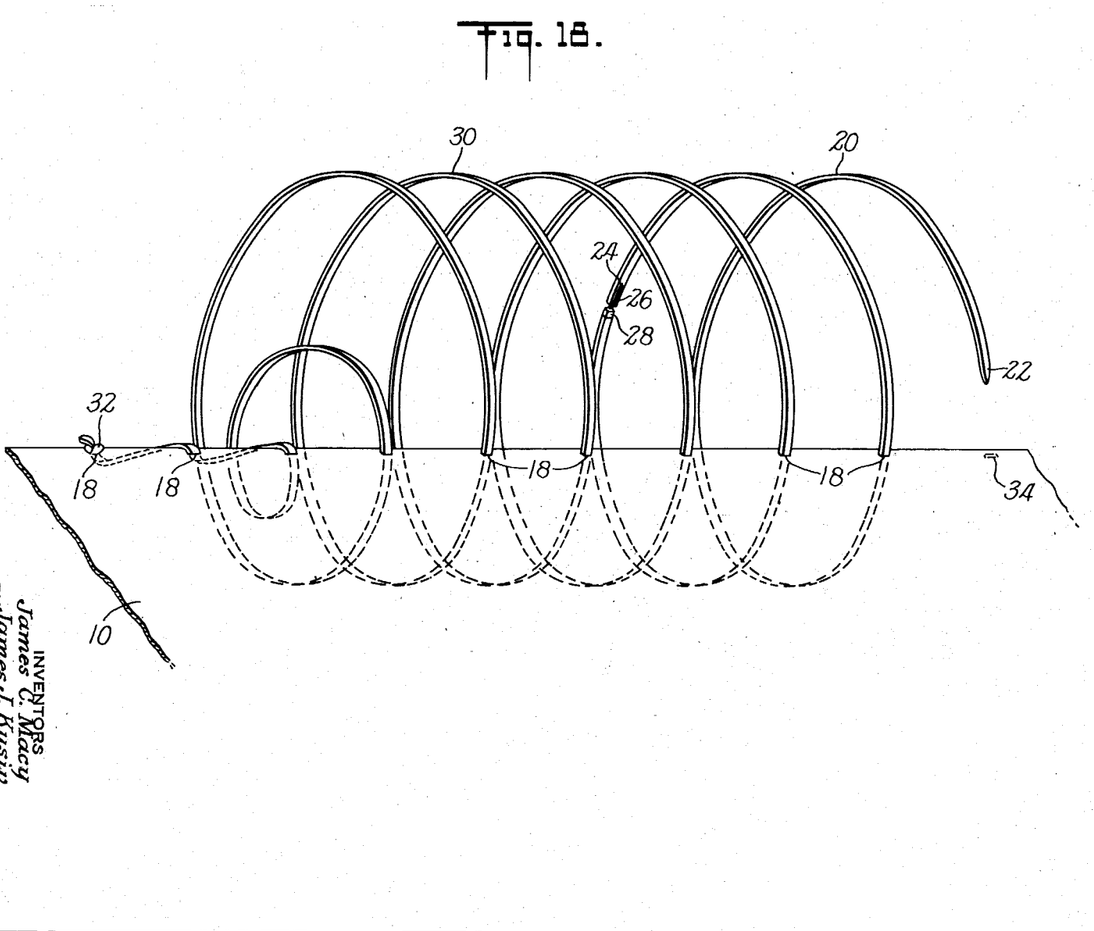

The structure and operation of this machine may be understood best if an explanation is first given as to the basic mode of operation and for this purpose reference will now be made to Figure 18. In this figure, the work piece 10 is shown with its openings 18 spaced much further from each other than they actually appear in practice, and the relative sizes are otherwise disproportionate. Referring to the right-hand portion of the figure, a helical steel needle 20 of rectangular cross-section and having a leading point 22 is of uniform helical pitch and diameter and extends one and one-half turns or 540° arcuately. The trailing end of the needle has an opening 24 through which extends a wire 26 which is attached to the leading end 28 of a strip of lacing 30. Lacing 30 extends through four turns and its trailing end then forms loops or lacings and the extreme end has a knot 32 which rests upon the top face of the work piece. Thus, from knot 32 the lacing projects downwardly through the left-hand hole 18 and thence extends in loops through successive holes to the right.

Needle 20 is shown with its leading end or point 22 projecting toward a zone 34 in the work piece where the needle will pierce the work piece and produce a hole 18. The needle is also shown threaded through the next adjacent holes 18. During operation needle 20 and the loops of lacing 30 are rotated clockwise when considered from the left-hand side of Figure 18, and during this rotation the trailing end of the rotating portion of the lacing is drawn through the successive holes 18. Thus, in Figure 18 the left hand end of the lacings having the knot 32 therein is stationary and from this end a loop is formed which extends out of the left-hand hole 18 and also to the right and up and around the adjacent edge of the work piece and thence through the next hole 18. The other lacing loops extend similarly to the right and around the edge of the work piece to the top again and down through the next hole. An expanded loop of the lacing is shown between the next two openings and this expanded loop is being reduced by virtue of the lacing being wound by the continued rotation of the remaining loops of the lacing at the right. This operation is continued with a loop being tightened at the left during each rotation of the needle and the rotating portion of the lacing.

Figure 4:
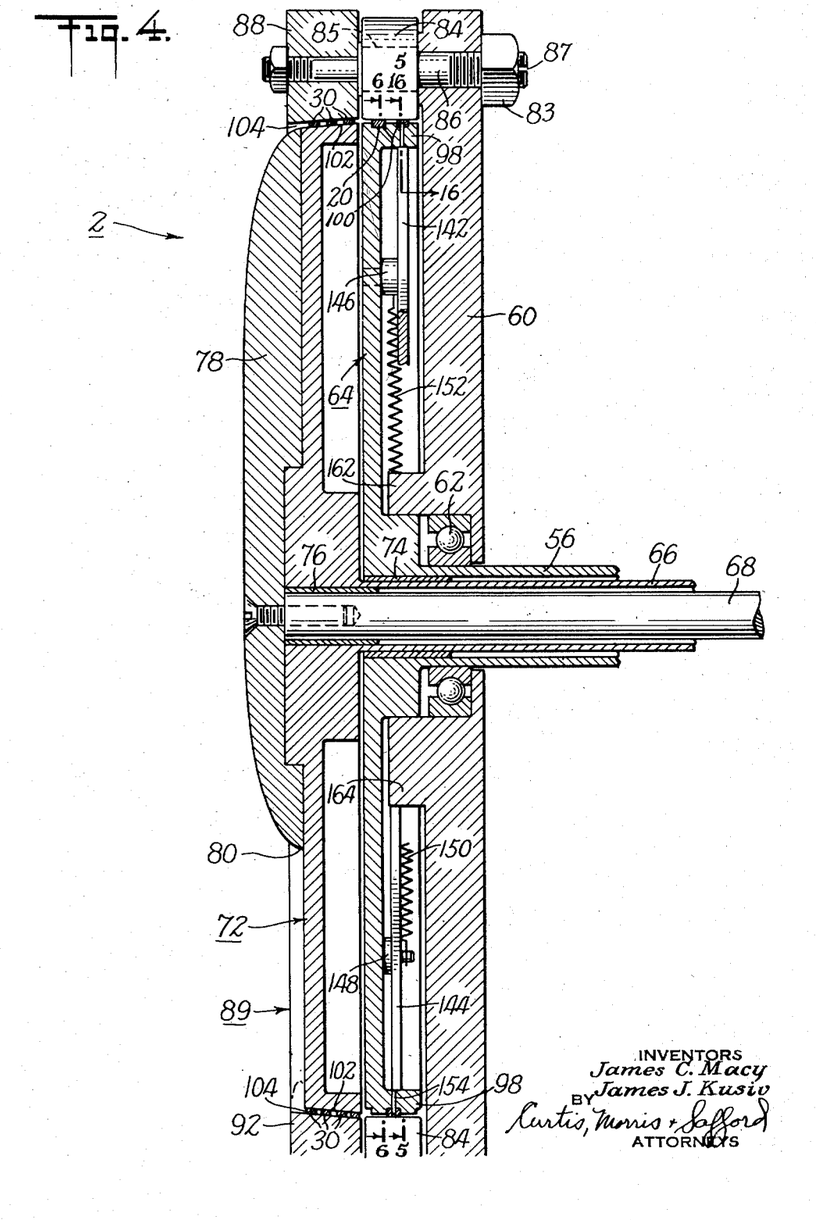
Figure 4 is an enlarged sectional view on the line 4—4 of Figure 3.

Referring again to Figure 2 the speed control mechanism 4 has a bevel gear 40 carried by its power output shaft and meshing with a bevel gear 42 fixed to a shaft 44 which is rotatably mounted in a pair of fixed bearings 46. Shaft 44 has keyed to it a pair of gears 48 and 50 which mesh respectively with a pair of gears 52 and 54. Gear 52 is mounted on and keyed to a hollow shaft 56 which is provided with a fixed bearing 58 and projects to the left through (see Figure 4) a central opening in a stationary plate 60 and is supported by a ball bearing unit 62. The left-hand end of shaft 56 carries a rotating needle drum 64 to be more fully described below. Projecting through shaft 56 is a hollow shaft 66 and a central stationary shaft 68, both of which project to the right (Figure 2) with shaft 66 having gear 54 keyed to it, and with the stationary shaft 68 being secured to a bracket 70.

Referring again to Figure 4 the left-hand end of hollow shaft 66 carries a rotating lacing drum 72 and is supported in shaft 56 by a sleeve bearing 74 while it has an internal sleeve bearing 76 which assists in supporting the stationary shaft 68. Fixed to the left-hand end of shaft 68 is a stationary end plate 78 shaped as shown best in Figure 3 with a generally disk-like configuration, but with a segment cut away at the bottom along a chordal line 80 which curves at its ends to the arcuate periphery of the plate.

As shown best in Figure 1 the stationary plate 60 is mounted on a bracket 82 and acts as a frame portion upon which are mounted the various elements including eleven rollers 84 (see also Figures 3 and 4); three of these rollers are mounted directly by a similar number of stud bolts 86 clamped to the plate by nuts 83, and each bolt has a "cam" or off-center shank 85 (see Figure 8) for its roller so that the position of the roller is adjusted by rotation of its bolt 86. This adjustment is made by inserting a screw driver in the slot 87 (see Figure 2) in the end of the bolt 86 and then tightening the nut 83.

Figure 3:
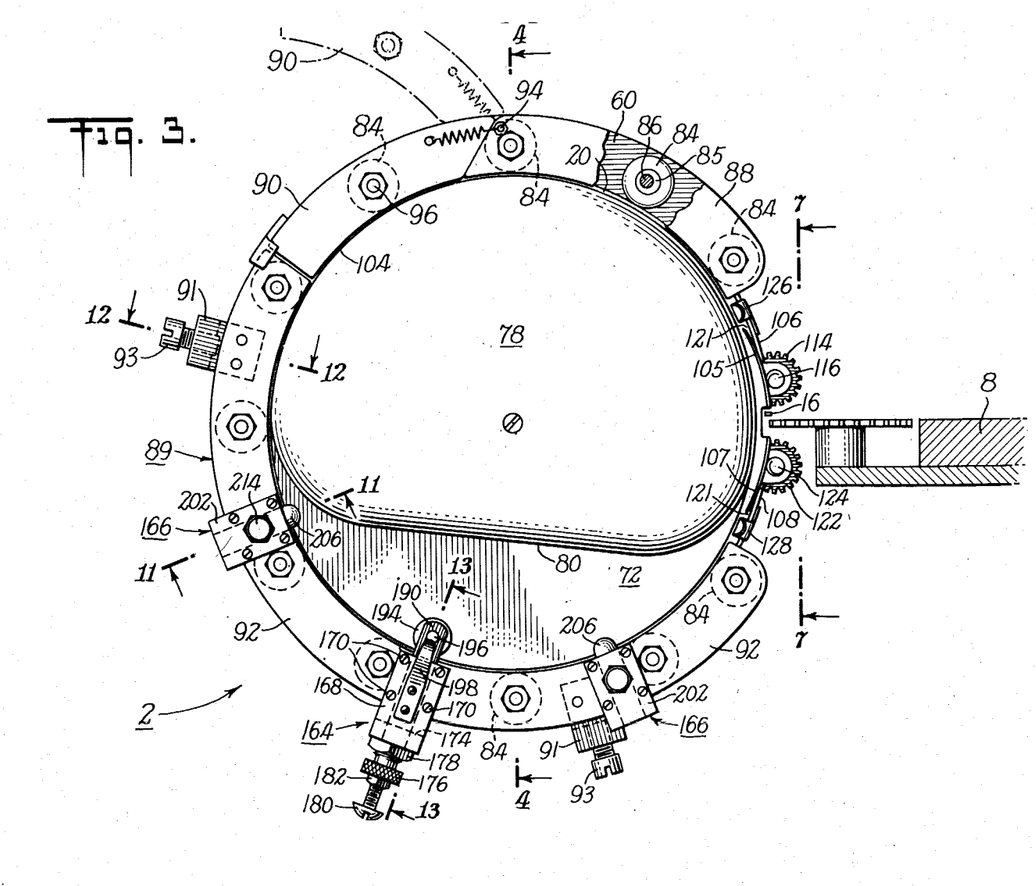
Figure 3 is a side elevation from the left-hand side of Figure 2.
Figure 12:
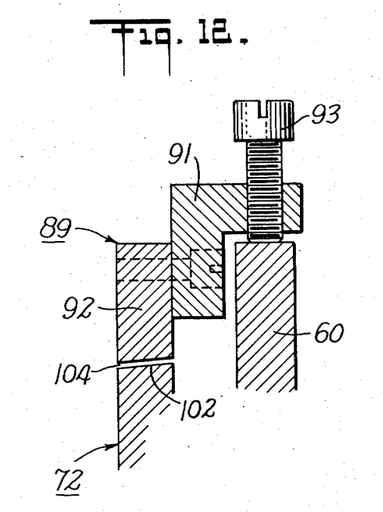

Bolts 86 also provide a mounting for segments of a rim or ring 89 which are a stationary top segment 88 shown at the upper right in Figure 3, and a swinging segment 90 shown at the left thereof and hinged thereto by a bolt 94. The swingable rim segment 90 carries one of the rollers 84 which is identical with the other rollers 84 and is mounted similarly by a stud bolt 96. Rim 89 also includes a stationary segment 92 which extends approximately 180 degrees around drum 72 and is adjustably mounted by a pair of brackets 91 (see also Figure 12). Brackets 91 are held by stud bolts 93 which are rotatably clamped in the periphery of plate 60 and are turned to adjust the segment 92.

The rotating needle drum 64 has a rim 98 which has a helical groove 100 which provides a helical recess for needle 20 (Figure 18), and extends from the right-hand (Figure 4) side of rim 98 which is adjacent the stationary plate 60 in a counter-clockwise direction (when viewed from the left-hand side of the rim) and terminates at the left-hand edge (Figure 4) of the rim. Needle 20 is rectangular in cross section and extends substantially 540° arcuately, i. e. one and one-half turns, around the rim, and during operation the needle is positioned within groove 100 except at the work zone where the needle passes through the recess. The needle is held in the groove by the rollers 84 which bear on the outer surface of the needle. The rotating lacing drum 72 is positioned adjacent needle drum 64 with the adjacent peripheral edges of the two drums in exact alignment. The rim assembly formed by segments 88, 90 and 92 are positioned in spaced relationship with respect to the surface of lacing drum 72 so as to provide an annular groove 104 or slot around the surface 102 of this drum which accommodates only a single layer of the lacing 30. Thus (see also Figure 18) with the needle terminating on drum 98 at the edge thereof which is adjacent drum 72 the helical turns of the lacing extend over onto drum 72 and lay side-by-side in a single layer on this surface 102.

Surface 102 is tapered at an angle of four degrees with respect to the axis of the drum with the diameter being lesser at the left, and the mating surfaces of the rim are correspondingly tapered so that slot 104 is of constant thickness. The arcuate periphery of the stationary plate 78 is in alignment with the left-hand edge of surface 102 with the result that the annular slot 104 is exposed at its left-hand edge.

Figure 7:
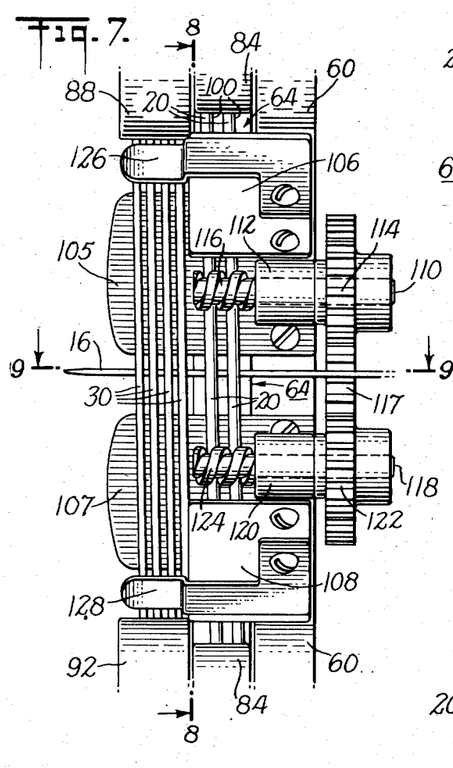
Figure 7 is an enlarged sectional view on the line 7—7 of Figure 3.
Figure 8:
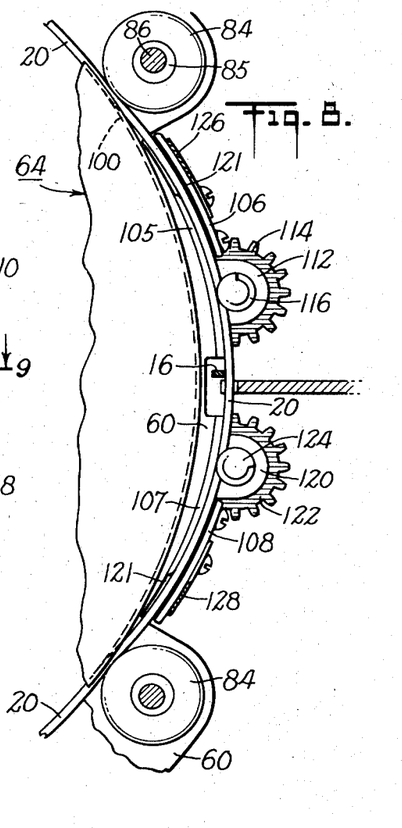
Figures 8 and 9 are sectional views, respectively, on the lines 8—8 and 9—9 of Figure 7.

Needle 20 is projected from the groove 100 throughout the work zone where it extends through the work piece and, as shown in Figure 8, the needle is guided through this zone partially by the work piece itself. However (see Figure 7), above the work piece there are bottom and top guide plates 105 and 106 which are clamped to the periphery of plate 60 and which projects to the left. Plate 105 extends beyond the work zone so that it is beneath the needle and the lacing loops and plate 106 extends only over rim 98. A similar set of guide plates 107 and 108 is similarly positioned beneath the level of the work zone and acts in that way. Clamped together with guides 106 and 108 are two spring guides 126 and 128 which have end shoes which are resiliently held against the turns of the lacing and tend to hold the lacing in place.

Figure 2:
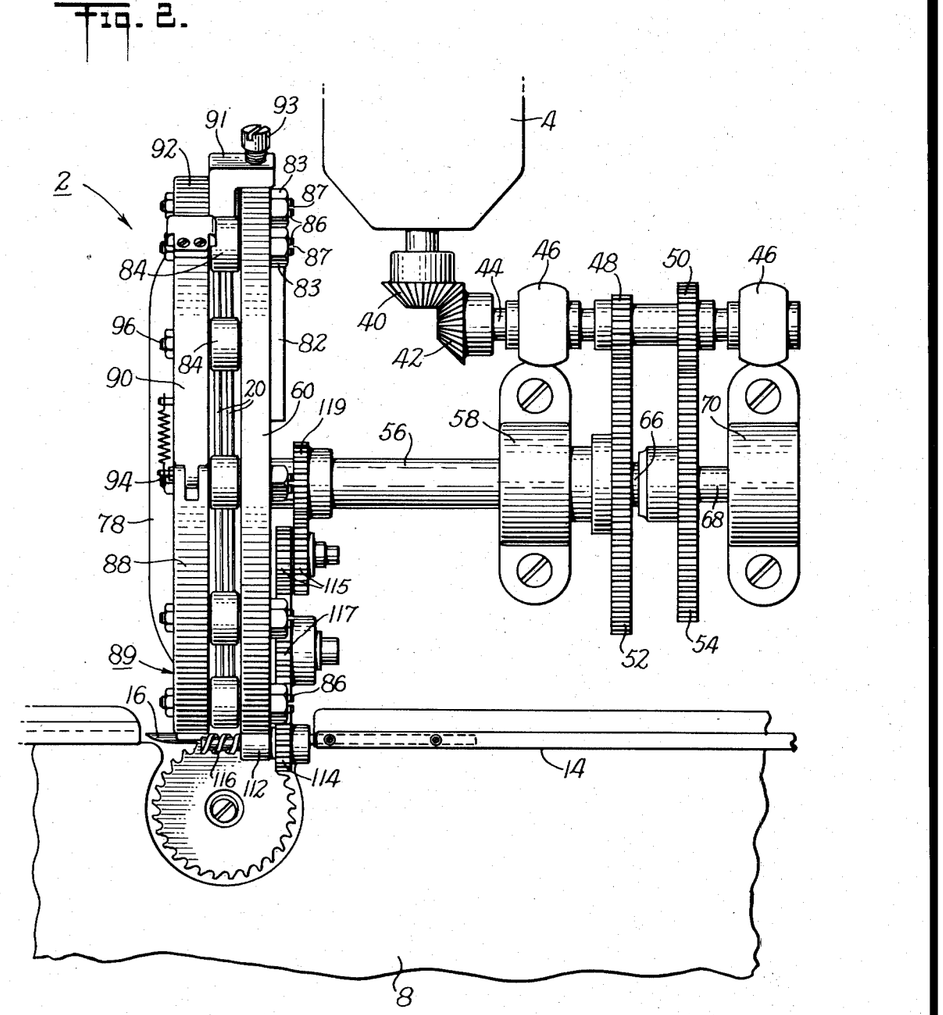
Figure 2 is an enlarged top plan view of a portion of the machine of Figure 1.

Positioned directly below plate 106 is a worm shaft 110 which is rotatably mounted in a bearing 112 and is adapted to be rotated by a gear 114 keyed to the shaft. The left-hand end of this shaft carries a helical worm 116 which is of such a pitch that it provides a groove positioned in alignment with each passing portion of the needle. At the bottom there is a similar worm shaft 118 mounted in a bearing 120 and driven by a gear 122; shaft 118 has a similar worm 124 which also has segments of its groove so aligned that the passing portions of the needle pass through them. These shafts 110 and 118 are rotated synchronously with the movement of the needle so that the turns of the needle are guided without interference. As shown in Figures 1, 2 and 7, gears 114 and 122 are driven through gears 115 and 117 from a gear 119 keyed to shaft 56.

Figure 5:
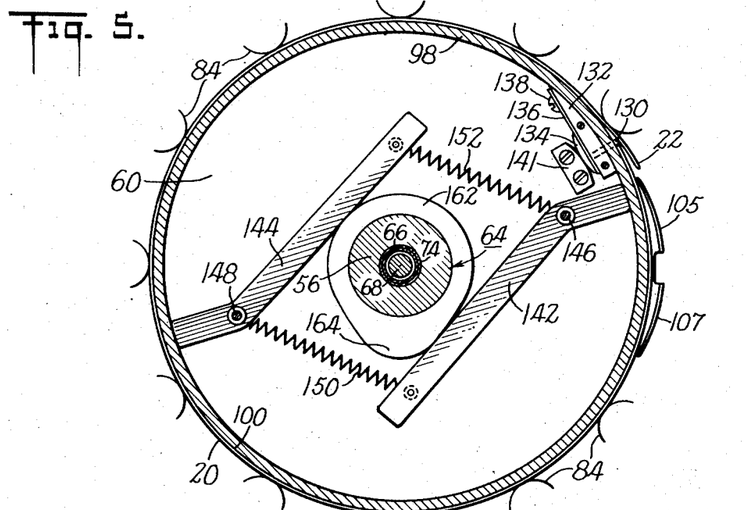
Figures 5 and 6 are fragmentary sectional views, respectively, on the lines 5—5 and 6—6 of Figure 4.
Figure 6:
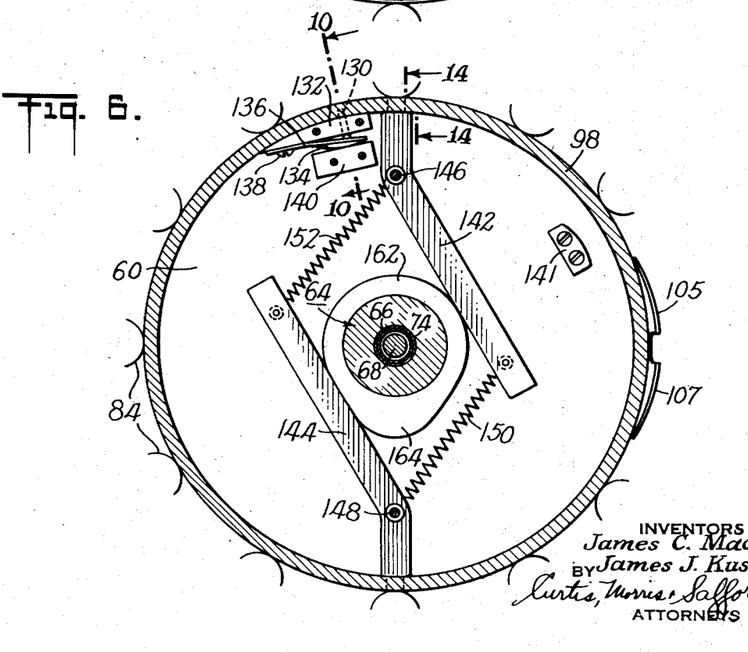
Figure 10:
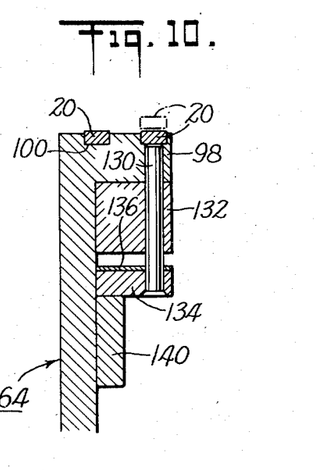
Figure 10 is a sectional view on the line 10—10 of Figure 6.

The above described arrangement tends to feed the work piece past the work zone and during each rotation of the needle its leading needle end 22 is pushed from the groove 100 into proper alignment with the space 121 between guide plates 105 and 106 above the work piece. This movement of the needle is imparted (see Figures 5, 6 and 10) by a pin 130 which is slidably mounted in a block 132 on the inside rim 98 (see also Figure 5). Pin 130 has its end fixed to a cam plate 134, which rests on a stop block 140 and is mounted on a spring 136, the end of which is clamped to block 132 by a screw 138. Fixed to the adjacent surface of the stationary plate 60 is a cam block 141 which is so positioned that it is engaged by plate 134 each time that the rotating drum approaches the position where the end of the needle is to be pushed out of groove 100. Then as cam plate 134 rides over block 141 the cam plate 134 is swung to the right (Figure 5) so as to slide pin 130 to the right. This pushes the top of the needle from groove 100 so that it passes through slot 121 and pierces the work piece at the proper point.

Figure 14:
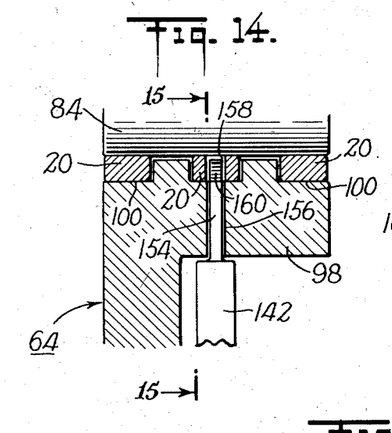
Figure 14 is a sectional view on the line 14—14 of Figure 6.
Figure 15:
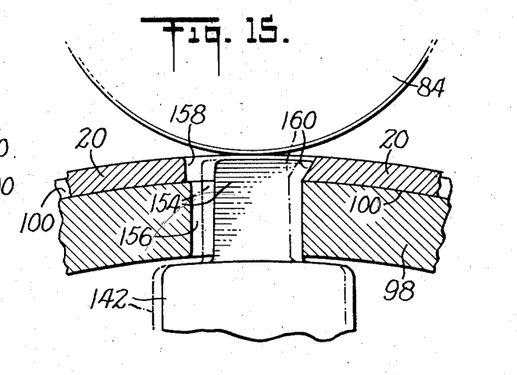
Figure 15 is a sectional view on the line 15—15 of Figure 14.
Figure 16:
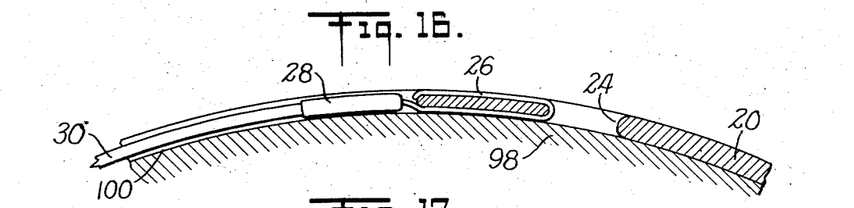
Figure 16 is an enlarged fragmentary sectional view on the line 16—16 of Figure 4.
Figure 17:
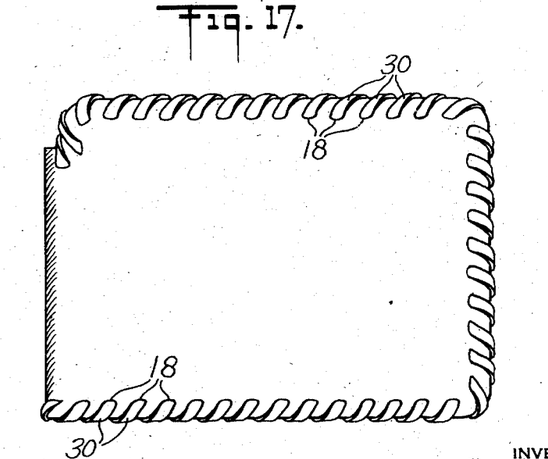
Figure 17 is a perspective view of an article produced on the machine here shown; and, Figure 18 is a somewhat schematic view illustrating the manner of operation of a machine here shown.

In accordance with the present invention, needle 20 is driven (see Figures 4, 5 and 6) with a positive movement by two driving arms 142 and 144 which are mounted on drum 64 by pivot 146 and 148, respectively. These arms are urged clockwise individually by springs 150 and 152 each connected at one end to its driving arm and at the other end to plate 64. Each of these driving arms has a needle-engaging portion (see also Figures 14 and 15) which comprises a thin rectangular dog or nose 154 which projects through a slot 156 in rim 98 and thence into a slot 158 in the needle. Nose 154 has a tapered lip 160 on its leading edge which overhangs and mates with a needle surface of the end of slot 158, thus to provide a driving contact between the nose portion of the driving arm and the needle which tends to hold the needle in the slot as it drives. Slot 156 is wider than nose 154 so as to permit the nose to move through the slot and thence edgewise to the position shown.

Referring again to Figures 5 and 6, the driving arms 142 and 144 have their driving engagements with the needle spaced one-hundred eighty degrees apart and as the zone of one of these engagements with the needle approaches the work zone, the respective nose 154 is withdrawn from the engagement with the needle and this permits the needle to move from its slot 100. This withdrawing of the noses is effected by a fixed cam 162 on plate 60 which has a rise 164. Cam 162 is positioned between the cam arms of the driving arms 142 and 144, and the rise on the cam is so positioned that each arm is rocked to the disengaging position as its needle-engaging end approaches the work zone. As indicated above, this rocks the respective driving arm so as to disengage it from the needle. Upon further rotation the driving arm passes the rise on the cam and returns to the full line position into driving engagement with the needle. Thus, the driving arms are disengaged alternately but there is a constant drive on the needle.

Figure 13:
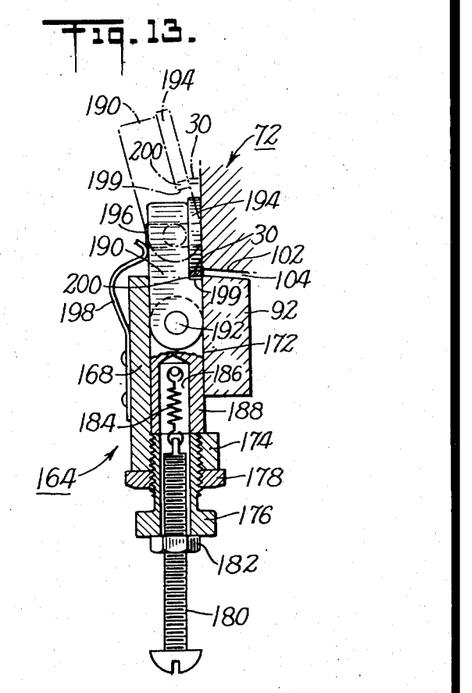

During operation, a loop of the lacing 30 is slipped out of slot 104 during each rotation of the needle and this loop is reduced in diameter as explained above so as to form the loop or lacing between two adjacent holes in the work piece. The releasing of these loops from the drum is controlled accurately by a stripper arrangement now to be described. Referring to the lower portion of Figure 3, this stripper arrangement comprises a sliding shuttle assembly 164 which is mounted on the rim segment 92 and, equi-distant from the assembly 164, two identical resilient holders 166 also mounted on the rim segment 92. Assembly 164 includes a shell bracket 168 clamped to rim segment 92 by a plurality of screws 170. Referring to Figure 13, bracket 168 has a longitudinal bore 172 which is square in cross-section and in alignment with the bore and at the bottom there is an internally threaded sleeve extension 174. Threaded into sleeve extension 174 is an adjusting sleeve 176 which is held in adjusted position by a lock nut 178.

Projecting up through sleeve 176 is a threaded bolt 180 having a nut 182 thereon, and attached at its upper end to a tension spring 184. The upper end of spring 184 is positioned in a cylindrical pocket or recess 186 in the bottom of a shuttle slide 188. Slide 188 has its upper end reduced to form the central knuckle of a hinge connection by which it is attached to a rockable shuttle slide 190. The lower end of slide 190 is bifurcated to form the outer knuckles of the hinge, and a pin 192 holds the slides together. Slide 190 carries a flat roller 194 upon a pivot pin 196, and a leaf spring 198 held by screws to bracket 168 presses against this slide so that the face of roller 194 is held against the face of the lacing drum 72.

Slide 190 is cut away to provide space for roller 194 and beneath the roller there is a ledge 199 which is in alignment with the adjacent edge of the rim portion 90. Ledge 199 forms with roller 194 a lacing pocket 200 which is in alignment with slot 104 and is adapted to receive a single turn of the lacing from this slot. Thus, during operation and in proper timed relationship, a turn of the lacing moves into pocket 200 and is therefore free of slot 104 at that point. The shuttle slide formed by slides 188 and 190 are resiliently held by spring 194 in the position shown in full lines, but they may be slid upwardly within bore 172 against the tension of this spring. Thus, with a turn of the lacing positioned in pocket 200, increased tension on the lacing causes the shuttle slide to move upwardly. During this movement the upper slide 190 moves upwardly with respect to and out from under the leaf spring 198 which urges this slide to the right, and slide 190 also emerges from bore 172 and therefore it rocks on the hinge pin 192 toward the position shown in broken lines. This rocking movement tips pocket 200 so that the lacing slides from the pocket and is therefore free. During its initial sliding movement upwardly the right-hand surface of slide 190 moves over the open edge of slot 104 so as to prevent additional turns from passing from the slot and later the lower slide 188 performs the same function. Thus, only one turn is permitted to escape from slot 104 at a time and then only when the tension on the lacing of that turn is sufficient to overcome the tension of spring 184.

Figure 11:
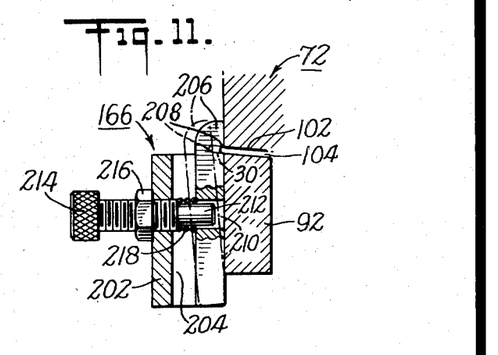
Figures 11, 12 and 13 are sectional views, respectively, on the lines 11—11, 12—12 and 13—13 of Figure 3.

The resilient holders 166 are somewhat similar in function to assembly 164, although they differ in structure. Referring to Figure 11 wherein one of the holders 166 is shown, there is a bracket 202 which is clamped to the rim portion 92 and which has a central channel 204 of rectangular cross-section. Positioned within channel 204 is a holding bar 206 which has a slot forming a lacing pocket 208 which is in alignment with slot 104 between the rim and the lacing drum 72. Holding bar 206 has a guide hole 210 in which is received the guide end portion 212 of a set screw 214 which is threadably received in an opening in bracket 202 and is held in adjusted positioning by a lock nut 216. Surrounding the guide end portion of set screw 214 is a compression spring 218 which rests at one end on a ledge on the set screw and at the other end against the left-hand surface of bar 206. Thus, the bar is urged to the full line position by spring 218 but it may slide and rock toward the left, to the broken line position against the action of this spring.

Thus, during operation the outer turn of the lacing may enter pocket 208 of each of the assemblies 166, the same as it enters pocket 202 in assembly 164. Then when the tension on the lacing in the pocket 208 becomes sufficiently great to overcome the force of spring 218, bar 206 is moved outwardly to the broken line position and the lacing turn slips from the pocket. Referring to Figure 3, the arrangement is such that the lacing turn is first released by assembly 164 and it is then released by the assembly 166 at the right after which it is released by the assembly 166 at the left. The lacing loop then is free and it is reduced and tightened as explained above.

During operation the loops in slot 104 tend to move toward the open end of the slot, and this action is aided by the rapid rotation of the lacing drum and the tapered surface 102. Under some circumstances an air jet may be used to promote this movement of the loops to the left.

What we claim as new is:

1. In apparatus of the class described for forming a lacing or the like into loops on a work piece, the combination of, a needle which extends arcuately and is adapted to pass through the work piece with the lacing or the like attached to its trailing end, a needle drum means by which said needle is carried and which is adapted to impart positive movement to the needle, drum means having a leading edge portion disposed adjacent the trailing end of said needle and a trailing edge portion at the opposite end thereof and a cylinder-like lacing supporting surface portion between said end portions upon which the lacing is wound and then rotates with the needle, and loop stripping means adjacent said trailing edge portion to strip an individual turn of the lacing from said drum means.

2. Apparatus as described in claim 1 wherein said needle extends arcuately substantially more than three-hundred sixty degrees whereby the leading point of the needle passes through the work piece prior to the passing of the trailing end of the needle from the next preceding hole in the work piece, and means to divert the needle from said needle drum means through the work zone where the needle passes through the work piece.

3. Apparatus as described in claim 2 wherein the last named means comprises, a pushing assembly mounted on the needle drum means and adapted to push the needle outwardly from the drum means, and a shield assembly forming an arcuate passageway which projects toward the work zone from substantially the zone where the needle is pushed from the drum means.

4. Apparatus as described in claim 3 which includes, a rotating guide member adjacent the work zone and presenting a spiral groove which is at all times in alignment with the needle as the needle passes toward the work piece.

5. Apparatus as described in claim 4 which includes, shield means and rotary guide means for the needle as the needle passes from the work piece, and wherein said needle drum means comprises a cylindrical drum having a spiral recess in its periphery into which said needle is adapted to rest, and a plurality of rollers spaced around said periphery and urging said needle into the space defined by said spiral groove.

6. Apparatus as described in claim 5 wherein said needle drum means includes, a pair of needle driving arms having noses which releasably engage the needle to impart positive rotation thereto and wherein said noses are individually disconnected from the needle.

7. Apparatus as described in claim 6 wherein each of said needle driving arms comprises a pivoted lever having one end resting upon a stationary cam surface and having its nose projecting from its other end, and wherein said needle has a slot into which each of said noses projects.

8. Apparatus as described in claim 7 wherein each of said noses has an undercut-engaging surface which extends forwardly and outwardly with respect to the direction of movement of the needle.

9. Apparatus as described in claim 1 wherein the means to strip an individual turn includes a plurality of releasing assemblies spaced radially from each other and adapted to receive one turn of the lacing or the like at a time and to release it automatically.

10. Apparatus as described in claim 9 wherein one of said releasing assemblies comprises a sliding shuttle having a pocket in alignment with the periphery of the lacing drum means, and spring means normally holding said sliding shuttle in the position named and adapted to move from said position and to release the lacing or the like upon the creation of predetermined tension.

11. Apparatus as described in claim 10 wherein said pocket is formed by a ledge defined by a portion of said shuttle and a roller mounted upon said shuttle adjacent said ledge and adapted to ride upon the lacing.

12. Apparatus as described in claim 11 wherein said lacing drum means is tapered with a reduced diameter at its edge remote from the needle drum means.

13. Apparatus as described in claim 12 which includes a stationary rim surrounding said lacing drum means and forming an annular slot therewith which is of such a thickness that it receives a single layer of the lacing or the like.

14. Apparatus as described in claim 13 wherein said needle drum means and said lacing drum means are individually driven with the lacing drum means being rotated at a greater speed.

15. Apparatus as described in claim 14 which includes a sword-like guide member positioned adjacent the work piece and adapted to have the lacing or the like bind it and the work piece, and means associated with said member operative to withdraw it from its position adjacent the work piece.

16. Apparatus as described in claim 14 wherein said lacing drum means presents a surface which tapers at an angle of substantially four degrees to the axis, and wherein the lacing drum means rotates at a speed approximately thirty per cent greater than said needle drum means.

17. A lacing machine having a helically configured needle movable about an axis of rotation, a work table substantially parallel to said axis and having an edge portion adjacent the path followed by said needle during rotation, and needle guide means adjacent said needle and said edge portion; said guide means defining guide surfaces cooperating with the portion of said needle at any time adjacent said edge portion and movable therewith and with respect to said edge portion.

18. A lacing machine including a power driven needle drum, an elongated arcuate needle encompassing said drum in driving relationship therewith, and needle-engaging means mounted adjacent said drum and operable upon said needle to deflect the needle away from the drum.

JAMES C. MACY.
JAMES J. KUSIV.

References Cited in the file of this patent

UNITED STATES PATENTS

| Number | Name | Date |
|---|---|---|
| 294,627 | Hunt | Mar. 4, 1884 |
| 399,744 | Dawson | Mar. 19, 1889 |
| 445,316 | Hathaway | Jan. 27, 1891 |
| 1,002,560 | Browning | Sept. 5, 1911 |